United States Patent
Osamura et al.

(10) Patent No.: US 9,916,042 B2
(45) Date of Patent: Mar. 13, 2018

(54) FINGERTIP POSITION ESTIMATION APPARATUS AND METHOD

(71) Applicant: FUJITSU LIMITED, Kawasaki-shi, Kanagawa (JP)

(72) Inventors: Kazuki Osamura, Kawasaki (JP); Taichi Murase, Kawasaki (JP); Takahiro Matsuda, Isehara (JP)

(73) Assignee: Fujitsu Limited, Kawasaki (JP)

( * ) Notice: Subject to any disclaimer, the term of this patent is extended or adjusted under 35 U.S.C. 154(b) by 61 days.

(21) Appl. No.: 15/005,146

(22) Filed: Jan. 25, 2016

(65) Prior Publication Data

US 2016/0224191 A1     Aug. 4, 2016

(30) Foreign Application Priority Data

Jan. 29, 2015   (JP) ................. 2015-015933

(51) Int. Cl.
   *G06F 3/042*   (2006.01)
   *G06K 9/46*    (2006.01)
   *G06K 9/00*    (2006.01)

(52) U.S. Cl.
   CPC ....... *G06F 3/0425* (2013.01); *G06K 9/00355* (2013.01); *G06K 9/4652* (2013.01)

(58) Field of Classification Search
   CPC combination set(s) only.
   See application file for complete search history.

(56) References Cited

U.S. PATENT DOCUMENTS

2009/0267893 A1   10/2009   Kato et al.

FOREIGN PATENT DOCUMENTS

| JP | 2002-209082 | 7/2002 |
| JP | 2003-346162 | 12/2003 |
| JP | 2009-265809 | 11/2009 |

*Primary Examiner* — Van N Chow
(74) *Attorney, Agent, or Firm* — Fujitsu Patent Center

(57) ABSTRACT

A fingertip position estimation apparatus includes a processor that executes a process. The process includes: identifying a first fingertip position of a finger included in an image, based on a color area model that defines a color of a finger; calculating dimensions of an area that is different from a background of the image, within an area of a prescribed size that is in contact with the first fingertip position and that is positioned in a direction in which a fingertip is pointing; and when the dimensions are larger than a prescribed threshold, estimating a second fingertip position that is positioned away from the first fingertip position in the direction in which the fingertip is pointing.

12 Claims, 14 Drawing Sheets

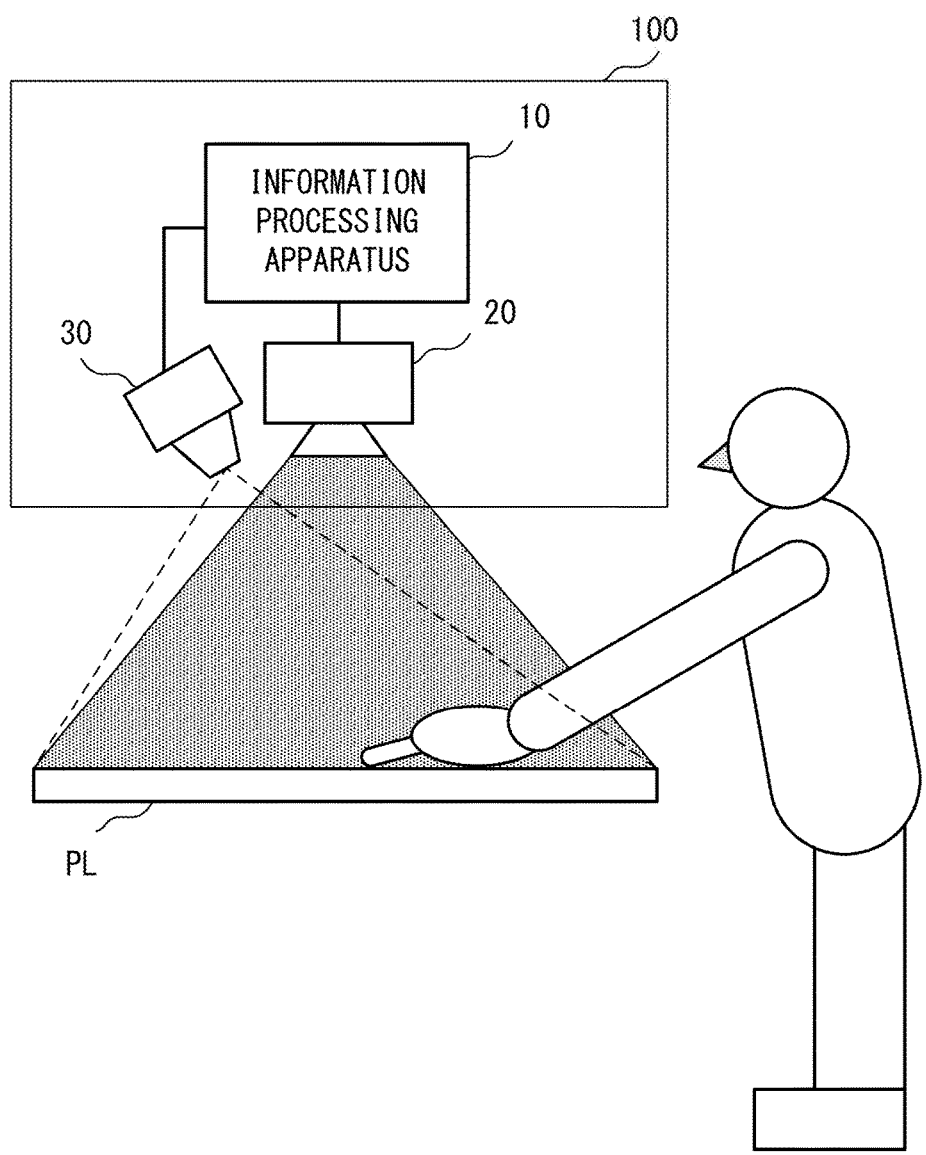
F I G. 1

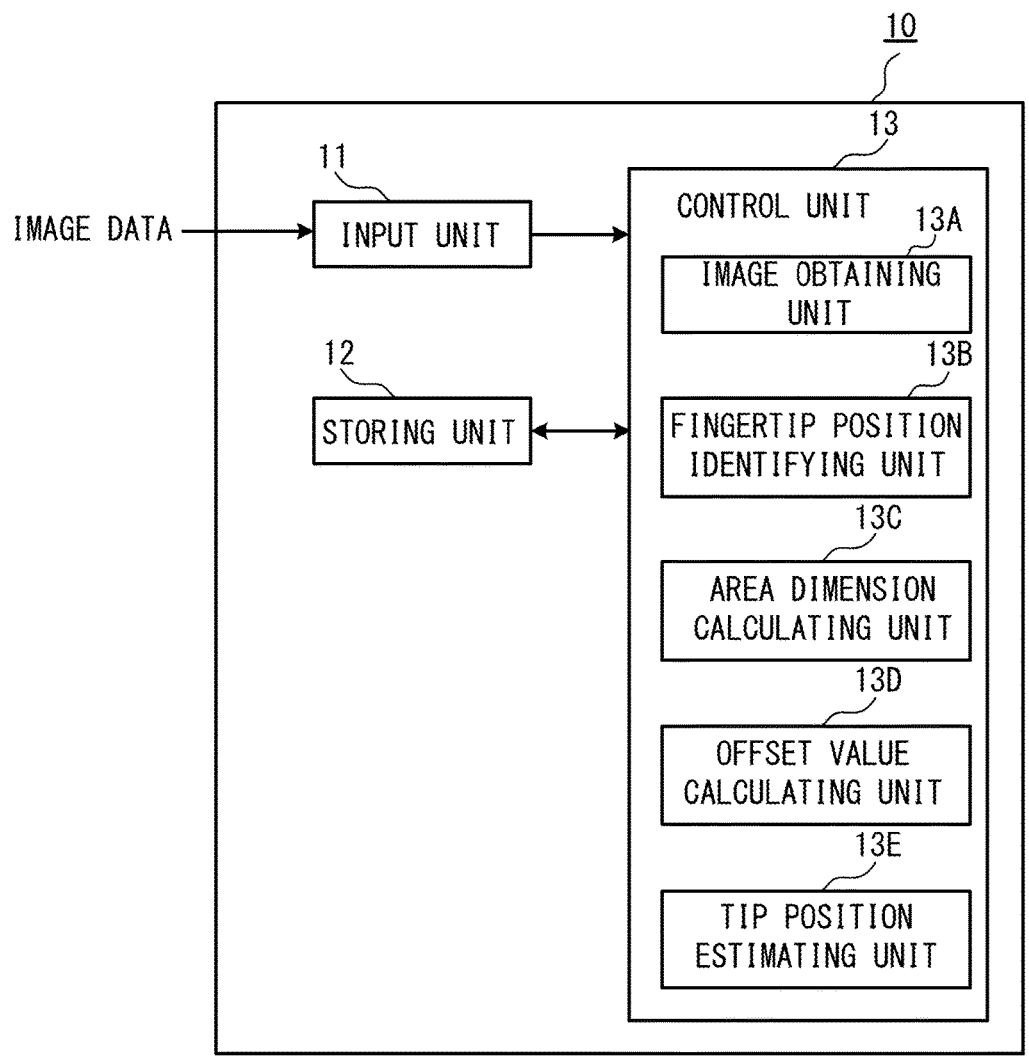
F I G. 2

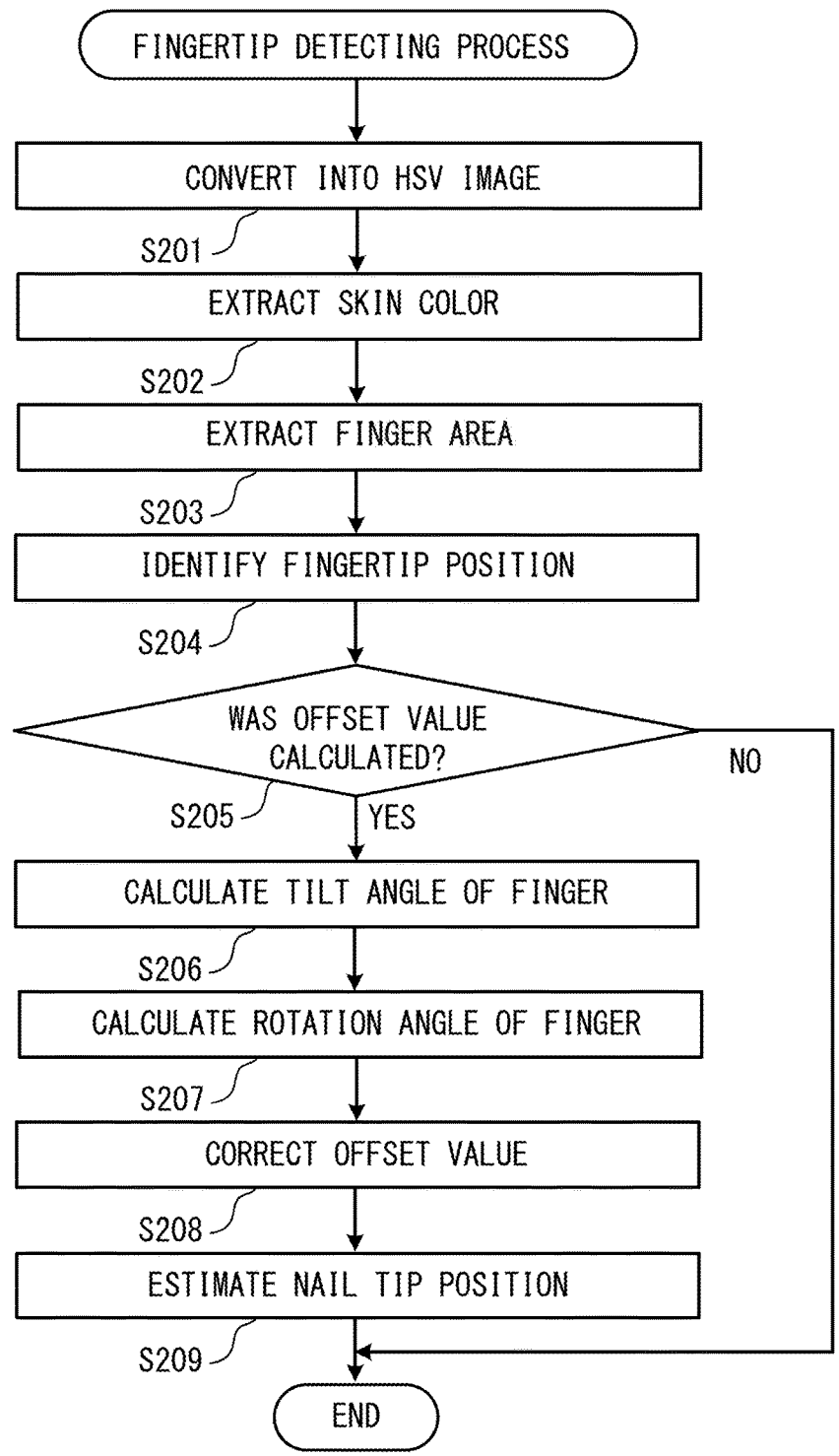
F I G. 1 3

FINGERTIP POSITION ESTIMATION APPARATUS AND METHOD

CROSS-REFERENCE TO RELATED APPLICATIONS

This application is based upon and claims the benefit of priority of the prior Japanese Patent Application No. 2015-015933, filed on Jan. 29, 2015, the entire contents of which are incorporated herein by reference.

FIELD

The embodiments discussed herein are related to a fingertip position estimation apparatus, a fingertip position estimation method, and a program.

BACKGROUND

In recent years, research and development of augmented reality technology has been actively conducted in which virtual images are projected onto real objects using a projector or the like in order to present notes, menus and the like associated with the real objects.

Meanwhile, in recent years, in order to improve usability of information terminal devices such as personal computers and smartphones, research and development of natural user interfaces that enable operations by actions that are more natural for humans and that are more intuitive have been actively conducted. For example, screen operations and voice conversations using hand gesture actions have been put into practical use and have begun to be utilized as new user interfaces in place of the keyboard, mouse and touch panel.

In addition, as an attempt to realize a more realistic user interface, use of actions such as touching and moving a real object have also been proposed. For example, a user interface technique has been realized in which a displayed object displayed by projection using a projector or the like is handled as if it were being directly controlled using fingers and other tools.

In techniques such as the user interface technique in which a displayed object is treated as if it were being directly controlled by a finger, the finger is recognized by detecting the area of the finger (hereinafter referred to as a finger area) from an image captured by an imaging device. As a technique for detecting the finger area, for example, a method is known in which a skin color area is extracted from a captured image, and a finger area is detected based on the features of the extracted shape. In this method, the finger area is detected by converting the captured image into an HSV (Hue, Saturation, Value) color representation image (hereinafter referred to as an HSV image) and performing skin color extraction and a binarization process.

In the skin color extraction, pixels included in the skin color area defined in the HSV color representation are extracted as the skin color. However, when nails are decorated with coloring, such as artificial nails and the like, the color distribution of the nail area may be excluded from the skin color area. This makes it difficult to accurately detect the finger area including the nail tip. Hereinafter, a nail decorated with coloring such as an artificial nail or the like is referred to as a decorated nail.

In the user interface technique in which a displayed object is treated as if it were being directly controlled by a finger, accurate detection of the fingertip position is very important because the displayed object is controlled according to the fingertip position.

In this regard, a method has been proposed for adjusting the color area that is to be detected as a finger area, so as to include the color distribution of a decorated nail. However, in the method in which the color area is adjusted, it is not always possible to detect the finger area including the nail tip, because nail decorations are in various colors. In addition, the color area is expanded so as to include the color distribution of decorated nails, and this increases the possibility of erroneously detecting the background as the finger area.

Meanwhile, techniques described in each of the following documents have been known.
Japanese Laid-open Patent Publication No. 2003-346162
Japanese Laid-open Patent Publication No. 2002-209082
Japanese Laid-open Patent Publication No. 2009-265809

SUMMARY

According to an aspect of the embodiments, a fingertip position estimation apparatus includes a processor that executes a process. The process includes: identifying a first fingertip position of a finger included in an image, based on a color area model that defines a color of a finger; calculating dimensions of an area that is different from a background of the image, within an area of a prescribed size that is in contact with the first fingertip position and that is positioned in a direction in which a fingertip is pointing; and when the dimensions are larger than a prescribed threshold, estimating a second fingertip position that is positioned away from the first fingertip position in the direction in which the fingertip is pointing.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 illustrates a configuration example of an interface system according to an embodiment;

FIG. 2 is a functional block diagram illustrating a configuration example of an information processing apparatus in an embodiment;

FIG. 13 is an example of a flowchart explaining the flow of a fingertip detecting process in an embodiment.

DESCRIPTION OF EMBODIMENTS

Figure 3A:
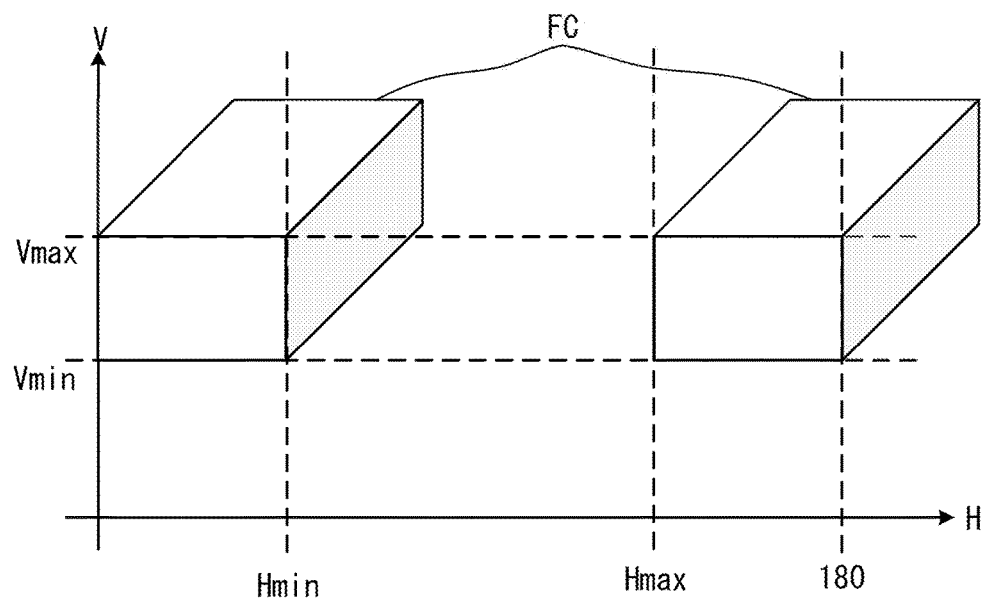
FIGS. 3A and 3B are both diagrams for explaining a skin color definition area.

Hereinafter, embodiments of the present invention are described in detail with reference to the drawings.

FIG. 1 illustrates a configuration example of an interface system 100 in the present embodiment. The interface system 100 includes a projector 20 that projects and displays an image on a work desk PL, a camera 30 that captures an image of the projection display on the work desk PL, and an information processing apparatus 10 to which the projector 20 and the camera 30 are connected. Meanwhile, when three-dimensional position information of a finger is required, the interface system 100 may be configured to include two cameras 30 so that the two cameras 30 capture stereoscopic images of approximately the same location.

FIG. 2 is a functional block diagram illustrating a configuration example of the information processing apparatus in the present embodiment. The information processing apparatus 10 in the present embodiment is an interface apparatus that detects the position of a finger and operations such as a touch with respect to the projection display, based on an image IMG captured by the connected camera 30. In addition, the information processing apparatus 10 in the present embodiment is also a fingertip position estimation apparatus that estimates the position of a nail tip in a case in which nail decoration N is applied to the nail of the user, based on the image IMG captured by the connected camera 30. The information processing apparatus 10 in the present embodiment includes an input unit 11, a storing unit 12, and a control unit 13, as illustrated in FIG. 2.

The input unit 11 is equipped with a camera interface or a communication module or the like, for example, and sequentially receives captured images IMG of the projection display from a connected imaging apparatus (the camera 30 in the present embodiment). Then, the input unit 11 temporarily stores the received images IMG in a frame memory (not illustrated in the drawing). The images IMG stored in the frame memory are sequentially obtained by an image obtaining unit 13A (to be described in detail later) at a timing matched with the timing of processing. Meanwhile, the input timing and the obtaining timing of the image IMG may be synchronized.

The storing unit 12 is equipped with a Random Access Memory (RAM), a Read Only Memory (ROM), a Hard Disk Drive (the HDD), or the like. The storing unit 12 functions as a work area for the Central Processing Unit (CPU) provided in the control unit 13, a program area for storing various programs such as the operation program for controlling the entirety of the information processing apparatus 10, and a data area for storing various data such as a background image captured from the projection display in a state without the finger.

The control unit 13 is equipped with a CPU or the like for example, and executes an operation program stored in the program area of the storing unit 12, in order to realize functions as an image obtaining unit 13A, a fingertip position identifying unit 13B, an area dimension calculating unit 13C, an offset value calculating unit 13D, and a tip position estimating unit 13E, as illustrated in FIG. 2. In addition, the control unit 13 executes an operation program to execute processes such as a control process for controlling the entirety of the information processing apparatus 10, a fingertip tracing process that is to be described in detail later, and the like.

The image obtaining unit 13A obtains an image IMG input sequentially to the input unit 11 at a timing matched with the timing of processing.

The fingertip position identifying unit 13B extracts the finger area in the image IMG obtained by the image obtaining unit 13A and identifies a fingertip position FT. More specifically, when the color information of the image IMG is defined in a color representation other than the HSV color representation, the fingertip position identifying unit 13B converts the image IMG into an HSV image. The conversion into the HSV image IMG may be performed by using a general conversion formula.

Then, the fingertip position identifying unit 13B extracts the skin color area in the HSV image IMG based on a skin color definition area FC defined in the HSV color representation. More specifically, the fingertip position identifying unit 13B judges respectively whether the color of a pixel is included in the skin color definition area FC, and when the color of the pixel is included in the skin color definition area FC, the pixel is extracted as a pixel in the skin color area.

Figure 3B:
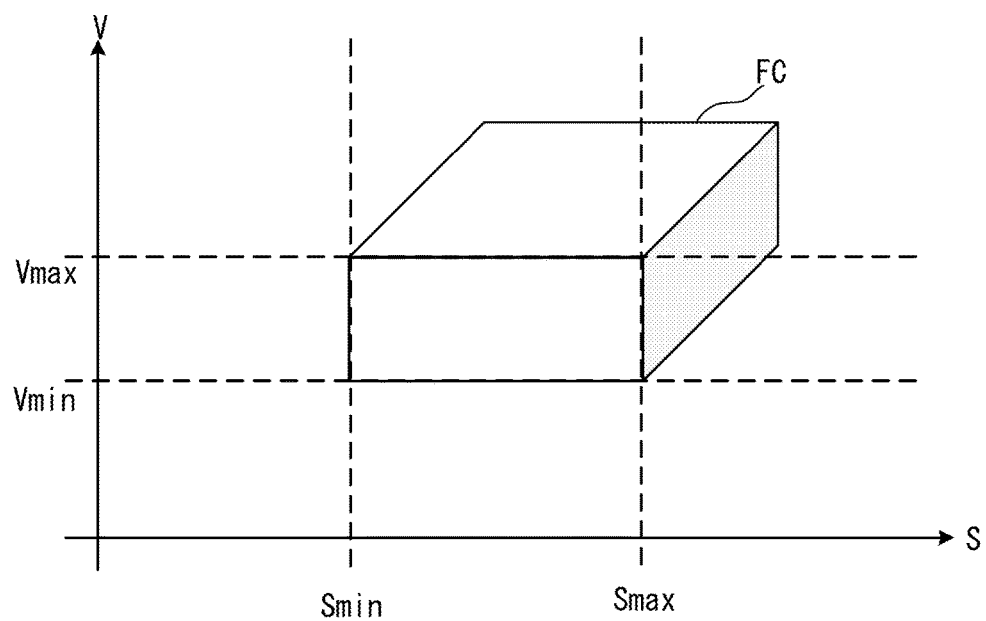

FIG. 3A and FIG. 3B are both diagrams for explaining the skin color definition area FC. The skin color definition area FC defines the area of the color to be extracted as the skin color (the color of the finger) by setting a lower limit threshold and an upper limit threshold with respect to each of hue (H), saturation (S) and lightness (V). That is, the skin color definition area FC is defined according to Expression 1 below.

$$\begin{cases} 0 < H < H\min,\ H\max < H < 180 \\ S\min < S < S\max \\ V\min < V < V\max \end{cases} \quad \text{[Mathematical 1]}$$

As an example of the skin color definition area FC, a definition may be given as Hmin=25, Hmax=175, Smin=45, Smax=200, Vmin=45, Vmax=255. Thus, the skin color definition area FC is defined so as to extract the skin color without consideration of a case in which the nail decoration N is applied to the nail.

Then, the fingertip position identifying unit 13B binarizes the HSV image IMG by setting "1 (white)" for a pixel included in the skin color definition area FC and setting "0 (black)" for a pixel that is not included in the skin color definition area FC, for example. The fingertip position identifying unit 13B extracts the finger area from the input image IMG as described above. Hereinafter, the image IMG that has been binarized is referred to as a binarized image IMG.

Then, the fingertip position identifying unit 13B identifies the fingertip position FT according to the shape of the extracted finger area. More specifically, for example, the fingertip position identifying unit 13B extracts feature points in the extracted finger area and obtains the coordinates (x, y) of the pixel corresponding to each of the feature points in the binary image IMG. At this time, the fingertip position identifying unit 13B obtains the coordinates (x, y) of the pixel of the fingertip position FT by performing pattern matching on a tip shape model of a finger and the shape of the extracted finger area.

Figure 4A:
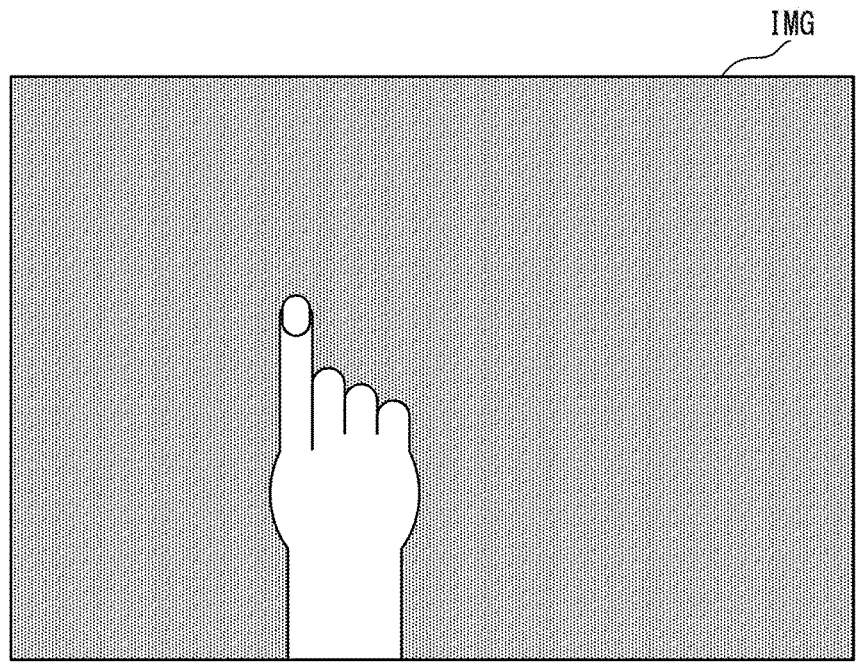
FIGS. 4A and 4B are both diagrams for explaining the fingertip position in a case in which nail decoration is not applied.
Figure 4B:
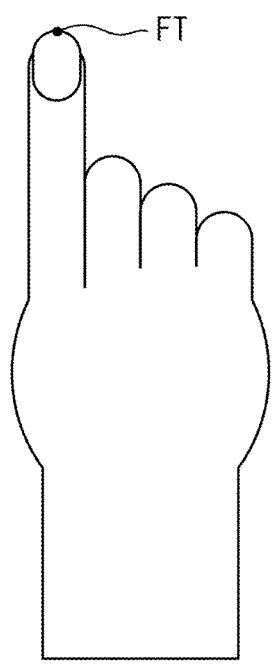
Figure 5A:
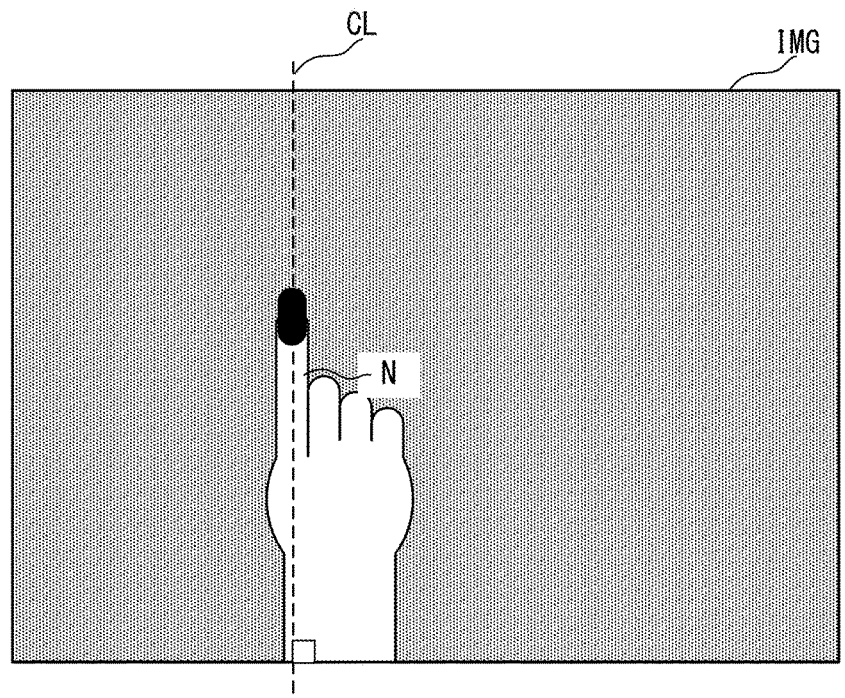
FIGS. 5A and 5B are both diagrams for explaining the fingertip position in a case in which nail decoration is applied.
Figure 5B:
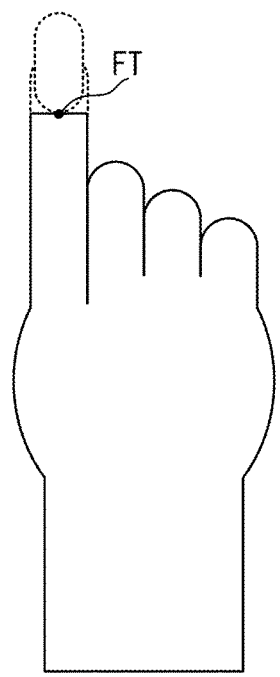

As described above, with respect to the skin color definition area FC for extracting the finger area, no consideration is given to a case in which the nail decoration N is applied to the nail N, and therefore, when the nail decoration N is applied to the nail, the fingertip position FT identified by the fingertip position identifying unit 13B may be different from the actual fingertip position. FIG. 4A and FIG. 4B are both diagrams for explaining the fingertip position FT in a case in which the nail decoration N is not applied. FIG. 5A and FIG. 5B are both diagrams for explaining the fingertip position FT in a case in which the nail decoration N is applied.

When the nail decoration N is not applied to the nail of the user as illustrated in FIG. 4A, the fingertip position identifying unit 13B is able to identify the tip of the nail as the fingertip position FT as illustrated in FIG. 4B. Meanwhile, when the nail decoration N is applied to the nail of the user, as illustrated in FIG. 5A, the fingertip position identifying unit 13B identifies the tip (lower edge) of the nail decoration N on the side of the base of the finger as the fingertip position FT.

Referring back to FIG. 2, the area dimension calculating unit 13C calculates the dimensions of the area of the nail decoration N. More specifically, the area dimension calculating unit 13C sets a nail window NW of a prescribed size such as the one illustrated in FIG. 6 with respect to the HSV image IMG, and cuts out the image in the nail window NW to create a nail window image NIMG. Then, the area dimension calculating unit 13C generates a difference image NIMG between an image of the area in the background image stored in the data area of the storing unit 12 corresponding to the nail window NW set in the HSV image IMG, and the nail window image NIMG. Then, the area dimension calculating unit 13C binarizes the difference image NIMG, and further removes noise by an opening/closing process, for example. At this time, the area dimension calculating unit 13C performs binarization by setting "1 (white)" for the pixel in the area of the difference portion, and "0 (black)" for the pixel in the same area as the background.

Then, the area dimension calculating unit 13C calculates the dimensions of the area of the nail decoration N by calculating the dimensions of the area of the pixels "1 (white)" in the binarized image NIMG after noise removal. The dimensions of the area of the nail decoration N may be obtained by calculating the number of pixels "1 (white)".

Figure 6:
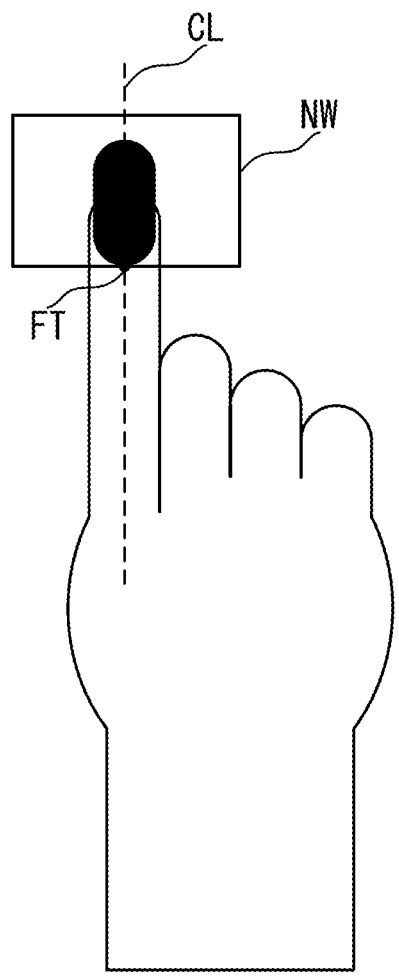
FIG. 6 is a diagram for explaining a nail window in an embodiment.
Figure 7:
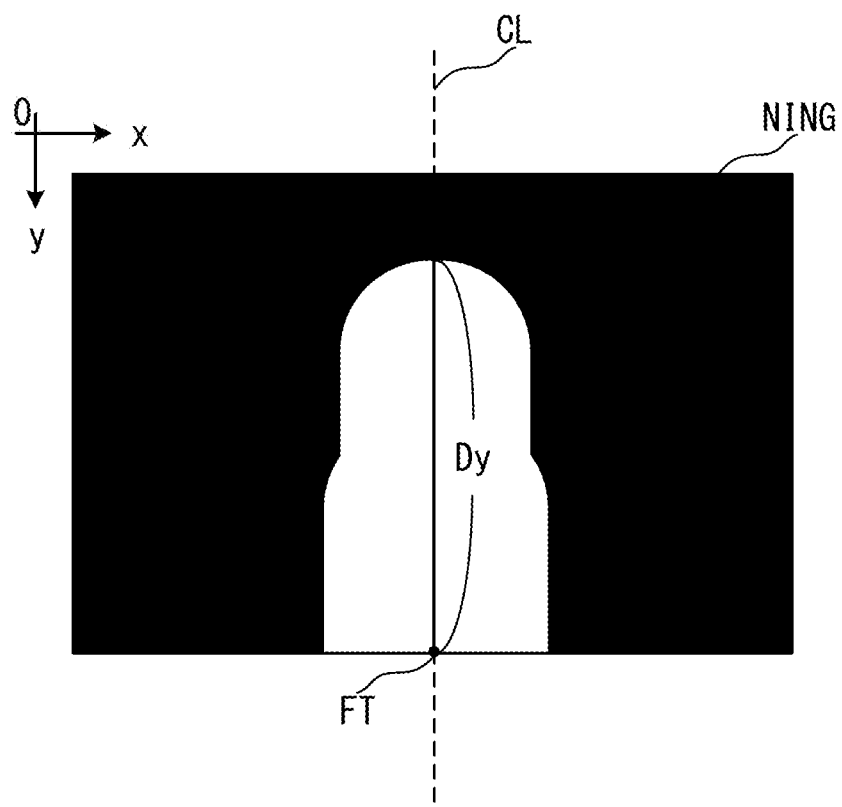
FIG. 7 illustrates an example of a nail window image after binarization and noise removal.

FIG. 6 is a diagram for explaining the nail window NW in the present embodiment. The nail window NW is set so that a straight line CL that passes through the fingertip position FT identified by the fingertip position identifying unit 13B and that represents the direction in which the finger (an index finger) is pointing divides the nail window NW into two equal parts, with the lower edge of the nail window NW being the fingertip position FT, as illustrated in FIG. 6. FIG. 7 illustrates an example of the nail window image NIMG after binarization and noise removal.

Referring back to FIG. 2, when the dimensions of the area of the nail decoration N calculated by the area dimension calculating unit 13C are greater than a prescribed dimension threshold Th, the offset value calculating unit 13D calculates an offset value $V_{os}$ according to the image IMG of the finger before the operation with the fingertip started (for example, the image of the first frame). The offset value $V_{os}$ is a distance between the nail tip in a state in which the finger is in a reference posture P1 (to be described in detail later) and the fingertip position FT. The offset value $V_{os}$ is calculated based on the image IMG of the finger before the operation started, because the finger before the start of the operation is thought to be close to the reference posture P1. Meanwhile, an image in the state in which the finger of the user is in the reference posture P1 may be registered before starting an operation, and the offset value $V_{os}$ may be calculated based on the image in the state of the reference posture P1.

More specifically, as the offset value $V_{os}$, the offset value calculating unit 13D calculates a height Dy of the area of the nail decoration N in the y-axis direction (the direction in which the finger is pointing) in the binarized image NIMG after noise removal generated by the area dimension calculating unit 13C. Referring to FIG. 7, the height Dy is the distance between the pixel whose value of y is the smallest among the pixels for which "1 (white)" is set and the pixel corresponding to the fingertip position FT in the binarized image NIMG after noise removal.

Meanwhile, a length L of an average index finger nail in the reference posture P1 may also be used as the offset value $V_{os}$.

Referring back to FIG. 2, when the dimensions of the area of the nail decoration N calculated by the area dimension calculating unit 13C are larger than the dimension threshold Th, the tip position estimating unit 13E estimates the position (Nx, Ny) of the nail tip in the processing-target image IMG, based on an image IMG of the finger during operation (for example, an image of the second or a subsequent frame). More specifically, the tip position estimating unit 13E calculates a tilt angle θ1 in the processing-target image IMG with respect to the reference posture P1.

Figure 8:
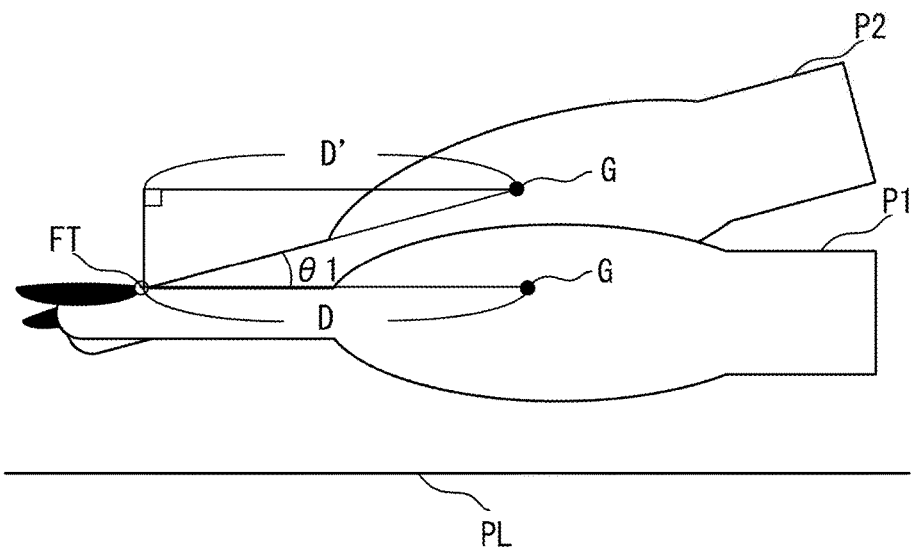
FIG. 8 is a diagram for explaining a tilt angle.

FIG. 8 is a diagram for explaining the tilt angle θ1. The reference posture P1 of the finger is a position in which the nail decoration N becomes horizontal to the top face (the projection face) of the work desk PL, as illustrated in FIG. 8. However, when performing an operation such as touching an icon on the projection display, the posture of the finger comes to a tilted state with respect to the reference posture P1, as in a position P2.

Then, the tip position estimating unit 13E calculates tilt angle θ1 of the actual finger with respect to the reference posture P1, according to Expression 2 below. Meanwhile, D in Expression 2 is the distance between the fingertip position FT and the center of gravity G of the finger in the reference posture P1. Meanwhile, D' in Expression 2 is the distance between the fingertip position FT and the center of gravity G of the actual finger seen from above, that is, the distance between the fingertip position FT and the center of gravity G of the finger in the processing-target image IMG. Meanwhile, the center of gravity G of the finger may be identified based on the finger area extracted by the fingertip position identifying unit 13B. In addition, the distance D for the reference position P1 may also be calculated based on the pre-registered image in the state in which the finger of the user is in the reference posture P1. In addition, the finger before the start of the operation is thought to be close to the reference posture P1, and therefore, for example, the distance D' between the fingertip position FT and the center of gravity G of the finger in the image IMG of the first frame may be regarded as the distance D.

$$\theta 1 = \text{arc } \cos(Dy/D) \quad \text{[Mathematical 2]}$$

Figure 9:
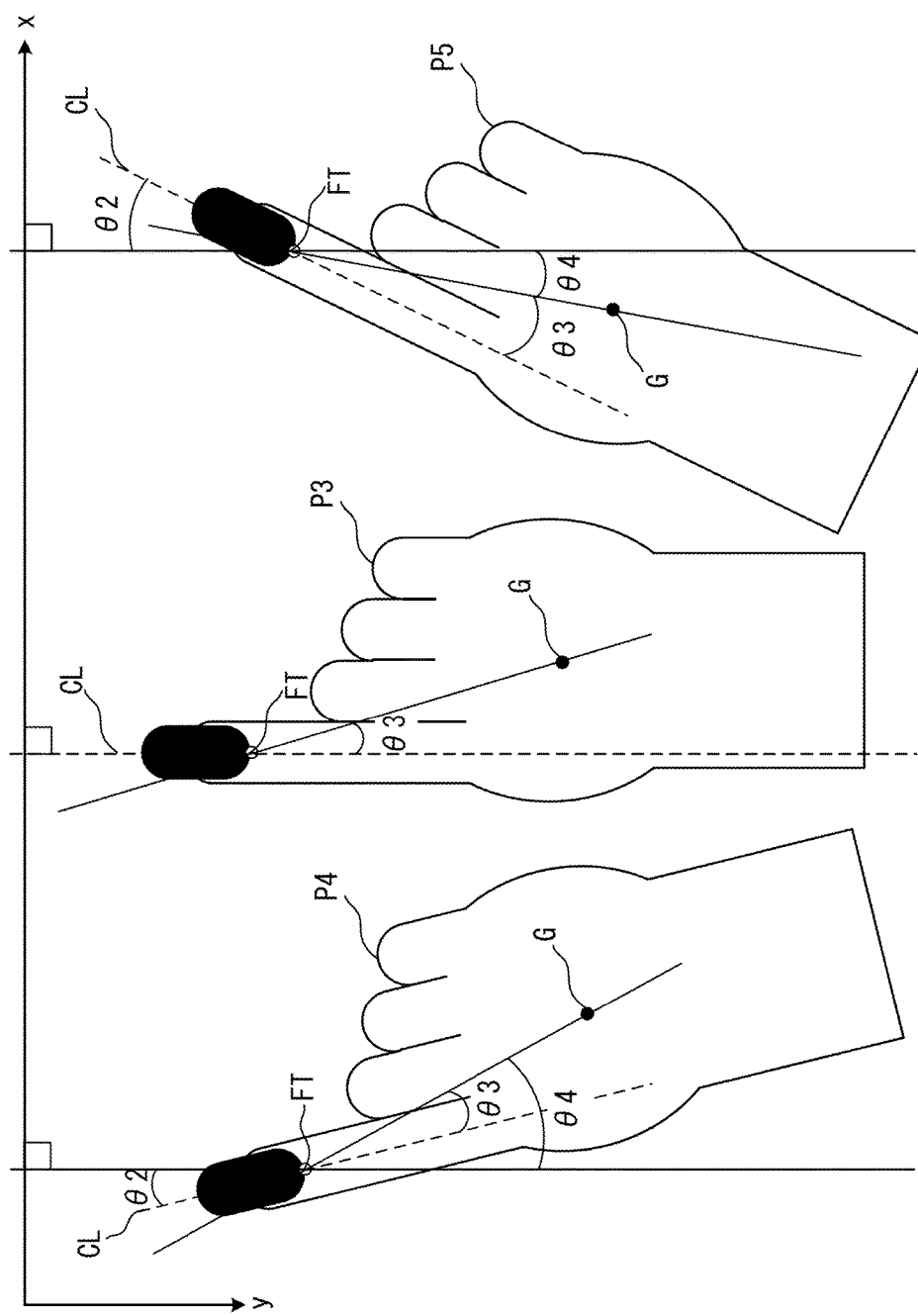
FIG. 9 is a diagram for explaining a rotation angle.

Then, the tip position estimating unit 13E calculates, setting a side of the image IMG as the y axis, an angle θ2 of the angle of the straight line CL that represents the direction in which the finger (an index finger) is pointing with respect to the y axis, that is, the rotation angle θ2 of the straight line CL with respect to the y axis is calculated. More specifically, referring to FIG. 9, the tip position estimating unit 13E calculates the rotation angle θ2 based on the tilt of the straight line CL in the processing-target image IMG. Setting the tilt of the straight line CL as "m", the tip position estimating unit 13E is able to calculate the rotation angle θ2 according to Expression 3 below. Here, FIG. 9 is a diagram for explaining the rotation angle θ2. Meanwhile, angles θ3 and θ4 in FIG. 9 are explained later.

$$\theta 2 = |\pi/2 - \arctan(m)| \quad \text{[Mathematical 3]}$$

Then, the tip position estimating unit 13E corrects the offset value $V_{os}$ calculated by the offset value calculating unit 13D according to the calculated tilt angle θ1 and the rotation angle θ2. That is, by making the offset value $V_{os}$ reflect the tilt and the rotation of the finger in the processing-target image IMG, the tip position estimating unit 13E calculates the coordinates (Vx, Vy) of the nail tip in a case in which the fingertip position FT in the processing-target image IMG is set as the reference (origin), according to Expression 4 below.

$$\begin{cases} Vx = (Vos \times \cos\theta 1) \times \sin\theta 2 \\ Vy = (Vos \times \cos\theta 1) \times \cos\theta 2 \end{cases} \quad \text{[Mathematical 4]}$$

Then, the tip position estimating unit 13E estimates the nail tip position (Nx, Ny) in the processing-target image IMG, based on the fingertip position FT and the offset value (Vx, Vy) corrected based on the tilt angle θ1 and the rotation angle θ2. More specifically, in the case of a position P4 in which the fingertip in the processing-target image IMG is tilted towards the left side with respect to the y axis, that is, when the tilt of the straight line CL is positive (m>0), the tip position estimating unit 13E estimates the nail tip position (Nx, Ny) in the processing-target image IMG according to Expression 5 below.

$$\begin{cases} Nx = FTx - Vx \\ Ny = FTy - Vy \end{cases} \quad \text{[Mathematical 5]}$$

On the other hand, in the case of a posture P5 in which the fingertip in the processing-target image IMG is tilted towards the right side with respect to the y axis, that is, when the tilt of the straight line CL is negative (m<0), the tip position estimating unit 13E estimates the nail tip position (Nx, Ny) in the processing-target image IMG according to Expression 6 below.

$$\begin{cases} Nx = FTx + Vx \\ Ny = FTy - Vy \end{cases} \quad \text{[Mathematical 6]}$$

As described above, when a nail decoration is applied to the nail, the tip position estimating unit 13E may obtain the tilt angle θ1 and the rotation angle θ2 of the finger, and may estimate the nail tip position (Nx, Ny) corresponding to the posture of the actual finger in the processing-target image IMG.

Meanwhile, by registering in advance an image in a state in which the straight line CL representing the direction in which the finger is pointing is parallel to the y axis of the image IMG and the posture of the finger is in the reference posture P1, the tip position estimating unit 13E may calculate the rotation angle θ2 according to Expression 7 below, based on an angle θ3 and an angle θ4. Here, referring to FIG. 9, the angle θ3 is the angle formed by the straight line CL representing the direction in which the finger is pointing and a straight line connecting the center of gravity G of the finger and the fingertip position FT in the processing-target image IMG. The angle θ4 is the angle formed by the y axis of the image IMG and the straight line connecting the center of gravity G of the finger and the fingertip position FT in the processing-target image IMG. That is, when the straight line CL is parallel to the y axis, the angle θ3 and the angle θ4 become equal.

$$\theta 2 = |\theta 3 - \theta 4| \quad \text{[Mathematical 7]}$$

The angle θ3 changes according to the angle of the tilt of the finger. For this reason, the angle θ3 is calculated by correcting, in consideration of the tilt angle θ1, the angle formed by the straight line CL representing the direction in which the finger is pointing (parallel to the y axis) and the straight line connecting the center of gravity G of the finger and the fingertip position FT in the pre-registered image. Hereinafter, the angle formed by the straight line CL representing the direction in which the finger is pointing (parallel to the y axis) and the straight line connecting the center of gravity G of the finger and the fingertip position FT in the pre-registered image is referred to as an angle θ5.

Figure 10:
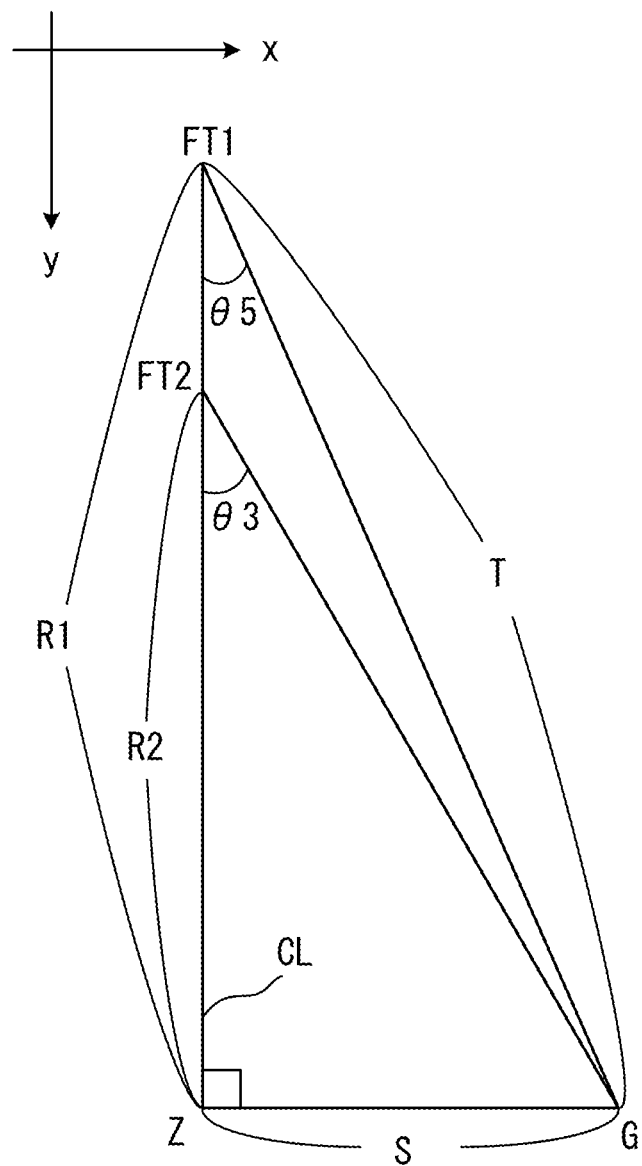
FIG. 10 is a diagram for explaining the angle formed by a straight line CL and a straight line connecting the center of gravity of a finger and the fingertip position.

FIG. 10 is a diagram for explaining the angle θ3 of the angle formed by the straight line CL and the straight line connecting the center of gravity G of the finger and the fingertip position FT in the processing-target image IMG. In FIG. 10, FT1 represents the fingertip position FT in an image in a state in which the straight line CL is parallel to the y axis and the position of the finger is in the reference position P1 (a pre-registered image). Meanwhile, FT2 in FIG. 10 represents the fingertip position FT in the processing-target image IMG. In this case, as illustrated in FIG. 10, the fingertip position FT2 in the processing-target image IMG moves on the straight line CL to a point in a direction closer to the base of the finger, due to the influence of the tilt of the finger.

Then, the tip position estimating unit 13E calculates the angle θ3 in the processing-target image IMG according to Expression 8 below. Meanwhile, setting a point Z as an intersection of the straight line CL and a straight line that passes through the center of gravity G and that is orthogonal to the straight line CL, R2 in Expression 8 is the distance between the point Z and the fingertip position FT2 in the processing-target image IMG, as illustrated in FIG. 10. In addition, S in Expression 8 is the distance between the point Z and the center of gravity G, as illustrated in FIG. 10.

$$\theta 3 = \arctan(S/R2) \quad \text{[Mathematical 8]}$$

The tip position estimating unit 13E may calculate the distance R2 according to Expression 9, since the distance R2 is the distance between the point Z and the fingertip position FT2 in the case in which the finger is tilted by an angle corresponding to the tilt angle θ1. In Expression 9, R1 is the distance between the point Z and the fingertip position FT1 in the pre-registered image, as illustrated in FIG. 10.

$$R2 = R1 \times \cos\theta 1 \quad \text{[Mathematical 9]}$$

Setting the distance between the fingertip position FT1 and the center of gravity G in the pre-registered image as T as illustrated in FIG. 10, the tip position estimating unit 13E may calculate the distance R1 according to Expression 10 below, based on the distance T and the angle θ5.

$$R1 = T \times \cos\theta 5 \quad \text{[Mathematical 10]}$$

In addition, the tip position estimating unit 13E may calculate a distance S according to Expression 11 below, based on the distance T and the angle θ5.

$$S = T \times \sin θ5 \qquad \text{[Mathematical 11]}$$

Therefore, the tip position estimating unit 13E may calculate the angle θ3 in the processing-target image IMG by calculating the distance T and the angle θ5 in the pre-registered image. The tip position estimating unit 13E may calculate the distance T based on the coordinates of the fingertip position FT (FT1 in FIG. 10) and the coordinates of the center of gravity G in the pre-registered image. In addition, the tip position estimating unit 13E may calculate the angle θ5 according to Expression 12 below, based on a vector from the fingertip position FT to the center of gravity G, since the straight line CL representing the direction in which the finger is pointing in the pre-registered image is parallel to the y axis. Meanwhile, the coordinates of the fingertip position FT in the pre-registered image are set as (x1, y1) and the coordinates of the center of gravity G in the pre-registered image are set as (x2, y2).

$$θ5 = \arctan((x2-x1)/(y1-y2)) \qquad \text{[Mathematical 12]}$$

Next, how to obtain the angle θ4 is explained. The angle θ4 is, as described above, the angle formed by the y axis and the straight line connecting the fingertip position FT and the center of gravity G in the processing-target image IMG. Therefore, the tip position estimating unit 13E may calculate the angle θ4 according to Expression 13 below, based on the vector from the fingertip position FT to the center of gravity G in the processing-target image IMG. Meanwhile, the coordinates of the fingertip position FT in the processing-target image are set as (x3, y3) and the coordinates of the center of gravity G in the processing-target image IMG are set as (x4, y4).

$$θ4 = \arctan((x4-x3)/(y4-y3)) \qquad \text{[Mathematical 13]}$$

Figure 11:
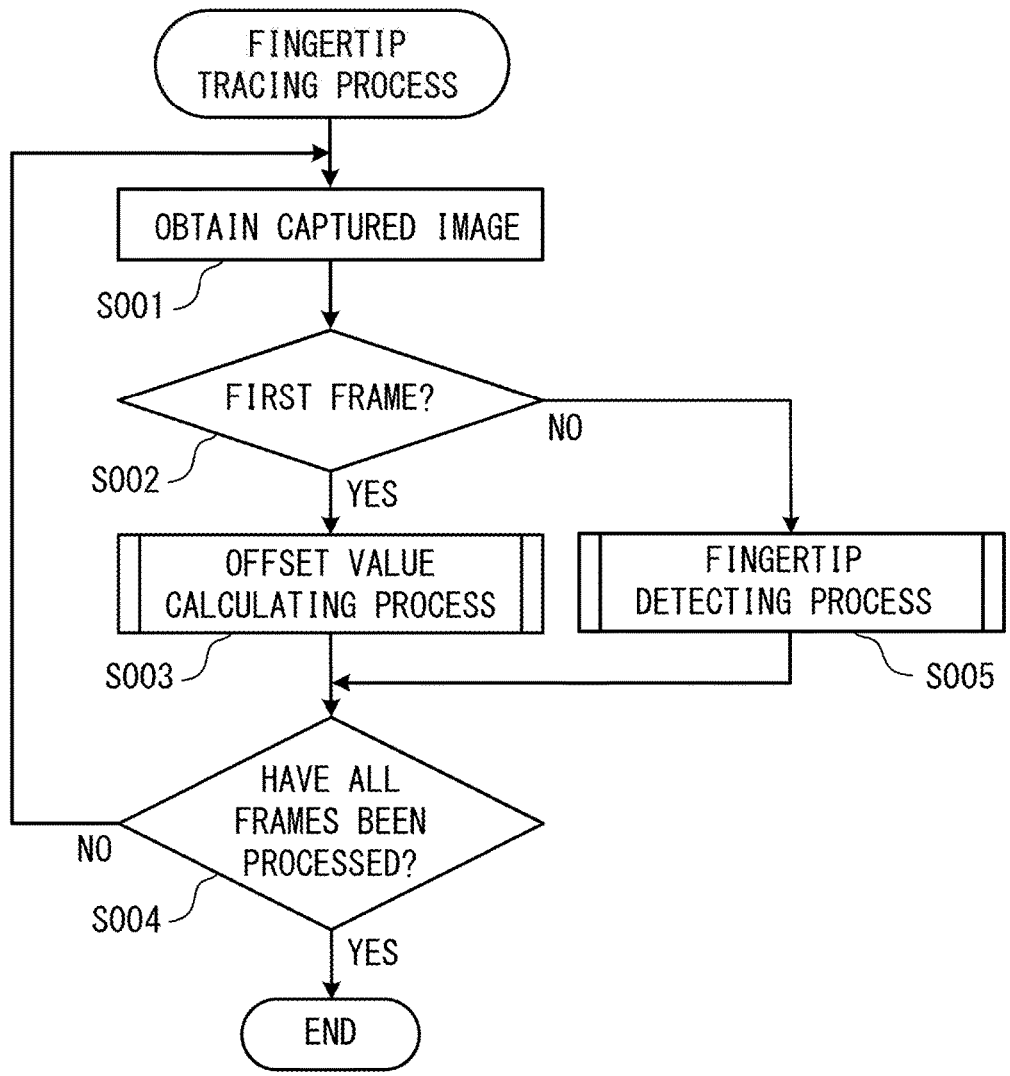
FIG. 11 is an example of a flowchart explaining the flow of a fingertip tracing process in an embodiment.

Next, referring to FIG. 11, the flow of the fingertip tracing process in the present embodiment is explained. FIG. 11 is a flowchart for explaining the flow of the fingertip tracing process in the present embodiment. Meanwhile, the explanation below is provided assuming that the finger area is included in the images IMG of all frames.

The image obtaining unit 13A obtains an image IMG captured by the camera 30 (step S001). Then, the image obtaining unit 13A determines whether or not the obtained image IMG is the image of the first frame (step S002). When the image obtaining unit 13A determines that the obtained image IMG is the image of the first frame (step S002; YES), the fingertip position identifying unit 13B performs an offset value calculating process in cooperation with the offset value calculating unit 13D and the like (step S003).

Then, the image obtaining unit 13A determines whether or not all the frames have been processed, by determining whether or not all the frames have been obtained (step S004). When the image obtaining unit 13A determines that all the frames have been processed (step S004; YES), the present process is terminated. On the other hand, when the image obtaining unit 13A determines that not all the frames have been treated (step S004; NO), the process returns to the process in step S001 and the processes described above are repeated.

When the image obtaining unit 13A determines in the process in step S002 that the obtained image is not the image of the first frame (step S002; NO), the fingertip position identifying unit 13B performs a fingertip detecting process in cooperation with the tip position estimating unit 13E (step S005). Then, the process proceeds to the process in step S004 described above.

Figure 12:
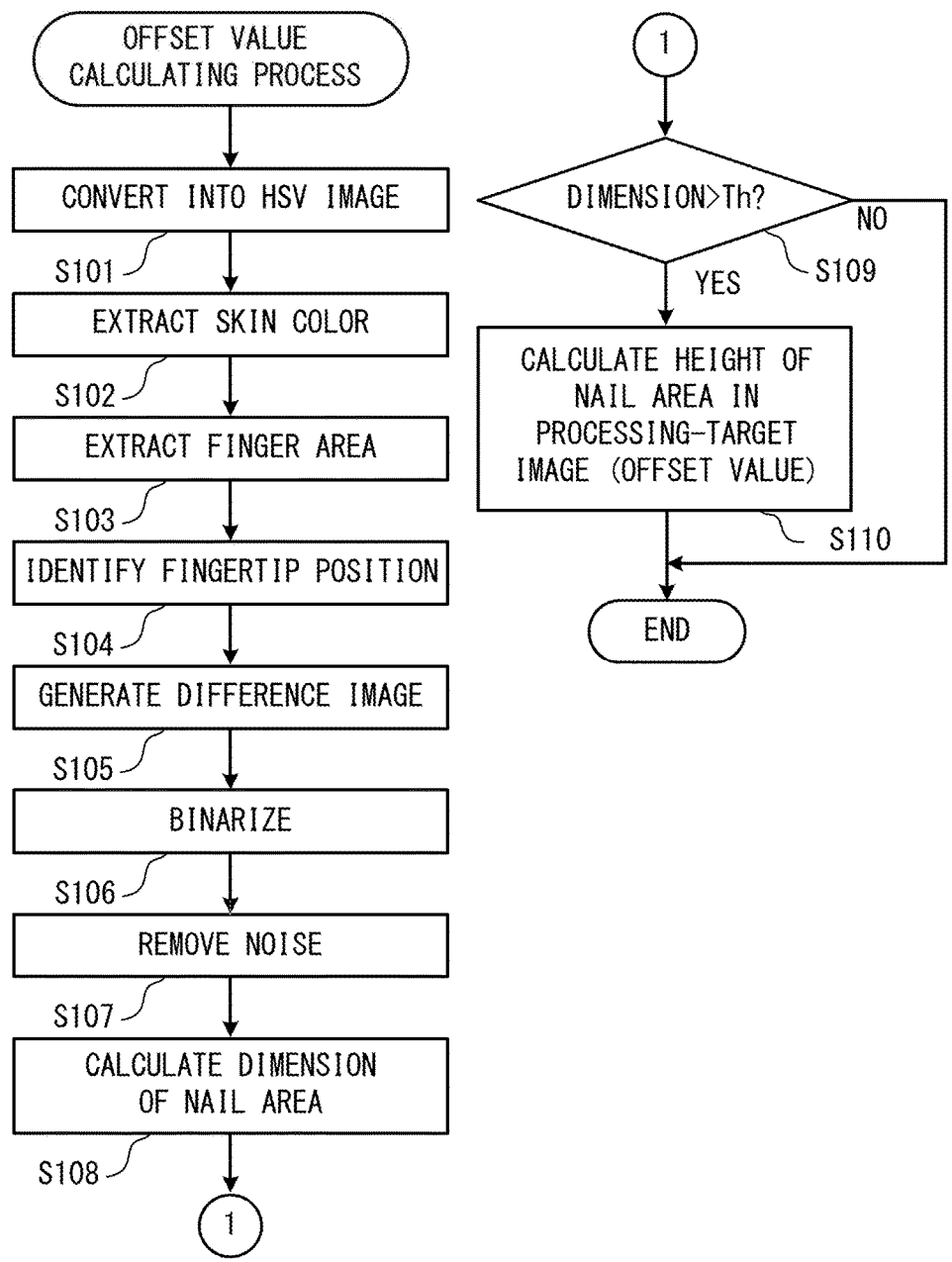
FIG. 12 is an example of a flowchart explaining the flow of an offset value calculating process in an embodiment.

Next, with reference to FIG. 12, the flow of the offset value calculating process in the present embodiment is explained. FIG. 12 is an example of a flowchart for explaining the flow of the offset value calculating process in the present embodiment. This offset value calculating process is a process corresponding to the process in step S003 in the fingertip tracing process described above.

When the color information of the obtained image IMG is defined in a color representation other than the HSV color representation, the fingertip position identifying unit 13B converts the image IMG into an HSV image (step S101). Then, the fingertip position identifying unit 13B extracts the skin color area based on the skin color definition area FC defined in the HSV color representation (step S102), and extracts the finger area from the processing-target image IMG based on the extracted skin color area (step S103).

Then, the fingertip position identifying unit 13B calculates the fingertip position FT based on the extracted finger area (step S104). Then, the area dimension calculating unit 13C sets the nail window NW on the HSV image and generates the difference image NIMG (step S105). Then, the area dimension calculating unit 13C binarizes the generated difference image NIMG (step S106) and removes noise (step S107). Then, the area dimension calculating unit 13C calculates the dimensions of the nail area in the binarized image NIMG after noise removal (step S108).

Then, the offset value calculating unit 13D determines whether or not the calculated dimensions of the nail area are larger than the dimension threshold Th (step S109). When the offset value calculating unit 13D determines that the dimensions of the nail area are equal to or smaller than the dimension threshold Th (step S109; NO), the present process is terminated, and the process proceeds to the process in step S004 in the fingertip tracing process described above.

On the other hand, when it is determined that the dimensions of the nail area are larger than the dimension threshold Th (step S109; YES), the offset value calculating unit 13D calculates the height Dy (=the offset value $V_{os}$) of the nail area in the processing-target image IMG, that is, the binarized image NIMG after noise removal (step S110). Then, the present process is terminated, and the process proceeds to the process in step S004 in the fingertip tracing process described above.

Next, referring to FIG. 13, a flow of the fingertip detecting process in the present embodiment is explained. FIG. 13 is an example of a flowchart for explaining the flow of the fingertip detecting process in the present embodiment. This fingertip detecting process is a process corresponding to the process in step S005 in the fingertip tracing process described above.

When the color information of the obtained image IMG is defined in a color representation other than the HSV color representation, the fingertip position identifying unit 13B converts the image IMG into an HSV image (step S201). Then, the fingertip position identifying unit 13B extracts the skin color area based on the skin color definition area FC defined in the HSV color representation (step S202), and extracts the finger area from the processing-target image IMG based on the skin color area (step S203).

Then, the fingertip position identifying unit 13B calculates the fingertip position FT based on the extracted finger area (step S204). Then, the tip position estimating unit 13E determines whether or not the offset value $V_{os}$ was calculated by the offset value calculating unit 13D (step S205).

When the tip position estimating unit 13E determines that the offset value $V_{os}$ was not calculated (step S205; NO), the present process is terminated, and the process proceeds to the process in step S004 in the fingertip tracing process described above.

On the other hand, when it is determined that the offset value $V_{os}$ was calculated (step S205; YES), the tip position estimating unit 13E calculates the tilt angle θ1 of the finger with respect to the reference posture P1 (step S206) and also calculates the rotation angle θ2 of the finger (step S207). Then, the tip position estimating unit 13E corrects the offset value $V_{os}$ based on the tilt angle θ1 and the rotation angle θ2 calculated (step S208).

Then, the tip position estimating unit 13E estimates the nail tip position (Nx, Ny) in the processing-target image IMG according to the fingertip position FT in the processing-target image IMG and the offset value (Vx, Vy) after correction (step S209). Then, the present process is terminated, and the process proceeds to the process in step S004 in the fingertip tracing process described above.

According to the embodiment described above, the information processing apparatus 10 identifies the fingertip position FT included in the captured image based on the skin color definition area FC that defines the color of the finger. Then, the information processing apparatus 10 calculates the dimensions of the area that is different from the projection display in the area within the nail window NW that is in contact with the fingertip position and that is positioned in the direction in which the finger is pointing. Then, when the dimensions are larger than the dimension threshold Th, the information processing apparatus 10 estimates the position of the nail tip that is positioned away from the fingertip position FT in the direction in which the finger is pointing. By so doing, it becomes possible to estimate the position of the tip of a finger to which nail decoration is applied.

In addition, according to the embodiment described above, the information processing apparatus 10 identifies the fingertip position FT of the finger included in the captured image based on the skin color definition area FC that defines the color of the finger without consideration of the case in which nail decoration is applied to the nail. By doing this, it becomes possible to estimate the position of the tip of a finger to which nail decoration is applied while suppressing erroneous detection of the background.

In addition, according to the embodiment described above, the information processing apparatus 10 estimates the position of the nail tip based on the length in the direction in which the finger is pointing in an area that is different from the projected display in the area within the nail window NW. By doing this, it becomes possible to estimate the position of the tip of a finger to which nail decoration is applied more accurately.

In addition, according to the embodiment described above, the information processing apparatus 10 estimates the position of the nail tip in consideration of the tilt angle θ1 of the posture of the finger in processing-target image IMG with respect to the reference position P1. By doing this, the estimation accuracy for the position of the tip of a finger to which nail decoration is applied may be further improved.

Figure 14:
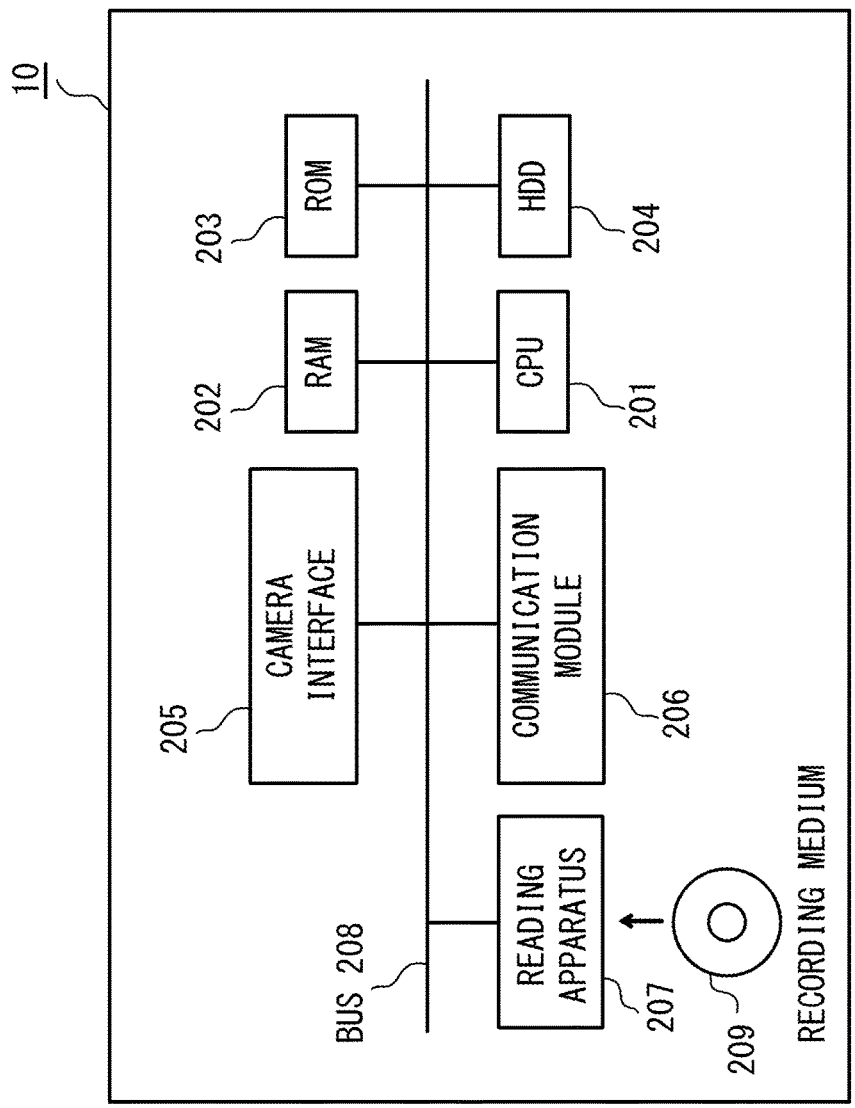
FIG. 14 illustrates an example of the hardware configuration of an information processing apparatus in an embodiment.

FIG. 14 illustrates an example of the hardware configuration of the information processing apparatus 10 according to an embodiment. The information processing apparatus 10 illustrated in FIG. 2 may be realized by various pieces of hardware illustrated in FIG. 14, for example. In the example in FIG. 14, the information processing apparatus 10 is equipped with a CPU 201, a RAM 202, a ROM 203, an HDD 204, a device interface 205 for connecting the projector 20, the camera 30 and the like, a communication module 206, and a reading apparatus 207, and these pieces of hardware are connected via a bus 208.

The CPU 201 loads an operation program stored in the HDD 204 onto the RAM 202, and executes various processes while using the RAM 202 as a working memory, for example. The CPU 201 may realize each of the function units of the control unit 13 illustrated in FIG. 2 by executing the operation program.

Meanwhile, the operation program for executing the operations described above may be stored and distributed in a computer-readable recording medium 209 such as a flexible disk, a Compact Disk-Read Only Memory (CD-ROM), a Digital Versatile Disk (DVD), a Magneto Optical disk (MO) or the like, and the processes described above may be executed by reading it using the reading apparatus 207 of the information processing apparatus 10 and installing it in the computer. Furthermore, the operation program may be stored in a disk apparatus or the like provided in a server apparatus on the Internet, and downloading or the like of the operation program on the computer of the information processing apparatus 10 via communication module 206 may be performed.

Meanwhile, depending on the embodiment, a storage apparatus of a type other than the RAM 202, the ROM 203, or the HDD 204 may be used. For example, the information processing apparatus 10 may be equipped with a storage apparatus such as a Content Addressable Memory (CAM), a Static Random Access Memory (SRAM), a Synchronous Dynamic Random Access Memory (SDRAM), or the like.

Meanwhile, depending on the embodiment, the hardware configuration of the information processing apparatus 10 may be different from that in FIG. 14, and it is also possible to apply pieces of hardware of standards and types other than those illustrated in FIG. 14 to the information processing apparatus 10.

For example, each of the function units of the control unit 13 of the information processing apparatus 10 illustrated in FIG. 2 may be realized by a hardware circuit. More specifically, each of the function units of the control unit 13 illustrated in FIG. 2 may be realized by a reconfigurable circuit such as a Field Programmable Gate Array (FPGA), or by an Application Specific Integrated Circuit (ASIC), or the like, instead of the CPU 201. Of course, these function units may be realized by both the CPU 201 and the hardware circuit.

Thus, some embodiments and their modification examples have been explained. However, it is to be understood that embodiments are not limited to the embodiments described above and include various modified forms and alternative forms of the embodiments described above. For example, it is to be understood that various embodiments may be embodied while modifying constituent elements without departing from their gist and scope. In addition, it is to be understood that various embodiments may be made by appropriately combining a plurality of constituent elements disclosed in the embodiments described above. Furthermore, it is to be understood by persons skilled in the art that various embodiments may be implemented by deleting or replacing some of the constituent elements among all the constituent elements presented in the embodiments, or by adding some constituent elements to the constituent elements presented in the embodiments.

The information processing apparatus 10 according to the embodiment makes it possible to estimate the position of the tip of a finger to which nail decoration is applied.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A fingertip position estimation apparatus including a processor that executes a process, the process comprising:
    identifying a first fingertip position of a finger included in an image, based on a color area model that defines a color of a finger;
    calculating dimensions of an area that is different from a background of the image, within an area of a prescribed size that is in contact with the first fingertip position and that is positioned in a direction in which a fingertip is pointing;
    determining whether or not the calculated dimensions of the area are larger than prescribed dimension threshold;
    generating a difference image between the area of the prescribed size and an area corresponding to the area of the prescribed size in a background image of only the background without a finger captured in advance;
    calculating a length, in the direction in which the fingertip is pointing, of the area that is different from the background within the area of the prescribed size, based on the difference image; and
    when it is determined that the calculated dimensions are larger than the prescribed dimension threshold, estimating, based on the calculated length, a second fingertip position that is positioned away from the first fingertip position in the direction in which the fingertip is pointing.

2. The fingertip position estimation apparatus according to claim 1, wherein
    in the estimating process, the second fingertip position is estimated based on a size of a nail of an average size.

3. The fingertip position estimation apparatus according to claim 1, wherein
    the process further comprises
        binarizing the difference image to generate a binarized image, and
    in the process of calculating the length, the length, in the direction in which the fingertip is pointing, of the area that is different from the background within the area of the prescribed size, is calculated based on the binarized image.

4. The fingertip position estimation apparatus according to claim 3, wherein
    the process further comprises
        removing a noise of the binarized image, and
    in the process of calculating the length, the length, in the direction in which the fingertip is pointing, of the area that is different from the background within the area of the prescribed size, is calculated based on the binarized image after the noise is removed.

5. The fingertip position estimation apparatus according to claim 1, wherein
    the length is a length in the direction in which the fingertip is pointing, of the area that is different from the background within the area of the prescribed size, in an image including the finger captured before an operation by the fingertip starts.

6. The fingertip position estimation apparatus according to claim 1, wherein
    the process further comprises
        when the dimensions are larger than the prescribed threshold, identifying the direction in which the fingertip is pointing.

7. The fingertip position estimation apparatus according to claim 6, wherein
    in the process of identifying the direction, the direction in which the fingertip is pointing is identified by calculating a degree of an angle formed by a vertical axis of an image and the direction in which the fingertip is pointing in the image.

8. The fingertip position estimation apparatus according to claim 1, wherein
    the image is a captured image of a projection display.

9. The fingertip position estimation apparatus according to claim 8, wherein
    the process further comprises
        correcting the second fingertip position based on a tilt angle of a posture of the finger at a time of image capturing with respect to a first posture in which the finger is approximately parallel to a projection face on which the projection display is projected.

10. The fingertip position estimation apparatus according to claim 1, wherein
    the color area model defines a color of a finger without consideration of a case in which a nail decoration is applied to a nail of the finger.

11. A fingertip position estimation method for a fingertip position estimation apparatus that estimates a fingertip position of a finger included in an image, the method comprising:
    identifying a first fingertip position of a finger included in the image, based on a color area model that defines a color of a finger;
    calculating dimensions of an area that is different from a background of the image, within an area of a prescribed size that is in contact with the first fingertip position and that is positioned in a direction in which a fingertip is pointing;
    determining whether or not the calculated dimensions of the area are larger than prescribed dimension threshold;
    generating a difference image between the area of the prescribed size and an area corresponding to the area of the prescribed size in a background image of only the background without a finger captured in advance;
    calculating a length, in the direction in which the fingertip is pointing, of the area that is different from the background within the area of the prescribed size, based on the difference image; and
    when it is determined that the calculated dimensions are larger than the prescribed dimension threshold, estimating, based on the calculated length, a second fingertip position that is positioned away from the first fingertip position in the direction in which the fingertip is pointing.

12. A non-transitory computer-readable recording medium having stored therein a program for causing a computer of a fingertip position estimation apparatus that estimates a fingertip position of a finger included in an image to execute a process, the process comprising:

identifying a first fingertip position of a finger included in the image, based on a color area model that defines a color of a finger;

calculating dimensions of an area that is different from a background of the image, within an area of a prescribed size that is in contact with the first fingertip position and that is positioned in a direction in which a fingertip is pointing;

determining whether or not the calculated dimensions of the area are larger than prescribed dimension threshold;

generating a difference image between the area of the prescribed size and an area corresponding to the area of the prescribed size in a background image of only the background without a finger captured in advance;

calculating a length, in the direction in which the fingertip is pointing, of the area that is different from the background within the area of the prescribed size, based on the difference image; and when it is determined that the calculated dimensions are larger than the prescribed dimension threshold, estimating, based on the calculated length, a second fingertip position that is positioned away from the first fingertip position in the direction in which the fingertip is pointing.

* * * * *